(12) United States Patent
Shikama (10) Patent No.: US 12,405,512 B2
(45) Date of Patent: Sep. 2, 2025

(54) BLADE DRIVING DEVICE, CAMERA DEVICE AND PORTABLE ELECTRONIC DEVICE

(71) Applicant: AAC Optics Solutions Pte. Ltd., Singapore (SG)

(72) Inventor: Kazuo Shikama, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 0 days.

(21) Appl. No.: 18/393,584

(22) Filed: Dec. 21, 2023

(65) Prior Publication Data

US 2025/0068035 A1  Feb. 27, 2025

(30) Foreign Application Priority Data

Aug. 22, 2023 (JP) ................. 2023-134549

(51) Int. Cl.
  *G03B 9/14* (2021.01)
  *G03B 30/00* (2021.01)
(52) U.S. Cl.
  CPC ............... *G03B 9/14* (2013.01); *G03B 30/00* (2021.01)
(58) Field of Classification Search
  CPC ............... G03B 9/04; G03B 9/08; G03B 9/14
  See application file for complete search history.

(56) References Cited

U.S. PATENT DOCUMENTS

| | | | | |
|---|---|---|---|---|
| 5,262,812 A | * | 11/1993 | Fukasawa | G03B 9/08 396/455 |
| 2004/0062542 A1 | * | 4/2004 | Watanabe | G03B 9/14 396/463 |
| 2011/0170852 A1 | * | 7/2011 | Numnual | G03B 9/04 396/505 |

* cited by examiner

*Primary Examiner* — Minh Q Phan
(74) *Attorney, Agent, or Firm* — Wiersch Law Group (57) ABSTRACT

Provided are a blade driving device, a camera device and a portable electronic device. The blade driving device includes a housing, a rotary body, a blade, at least one driving coil, a circuit board and at least one magnetic yoke. At least one rotating shaft extending into the accommodation space is disposed on the housing. The rotary body is a magnetic member with at least two magnetic poles. The blade includes one end fixedly connected to the rotary body and rotatable with the rotary body, and another end provided with a shielding portion and an opening portion. Compared with the related art, the present disclosure achieves compactness by omitting a number of mounted parts, realizing high efficient utilization of space and simplicity of structure and assembly, and enabling more efficient blade driving with a simpler structure.

18 Claims, 10 Drawing Sheets

BLADE DRIVING DEVICE, CAMERA DEVICE AND PORTABLE ELECTRONIC DEVICE

CROSS-REFERENCE TO RELATED APPLICATION

This application claims priority to Japanese Patent Application No. 2023134549, entitled "BLADE DRIVING DEVICE, CAMERA DEVICE AND PORTABLE ELECTRONIC DEVICE," filed Aug. 22, 2023, which is incorporated herein by reference in its entirety.

TECHNICAL FIELD

The present disclosure relates to the technical field of camera devices and, in particular, relates to a blade driving device, a camera device, and a portable electronic device.

BACKGROUND

With the rapid development of camera technology, blade driving devices and lens drive devices have been widely used in many camera devices. Optical devices having blade driving devices are applied to various portable electronic device, such as mobile telephones and tablet computers, which are particularly popular with consumers.

A blade driving device drives single or multiple blades to change a state of an opening, and is used as a shutter, an aperture, an aperture-compatible shutter, a filter or the like in various optical units such as cameras. In the blade driving device, the electromagnetic actuator is split at the assembly stage, and due to the interaction of deterioration of assemblability, increase in the number of parts, and loosening caused by the increase in the number of parts, the structural difficulty of the blade driving device itself may become high.

Although there is a moving unit that uses a shape memory alloy with a small area in structure, a length of the shape memory alloy needs to be increased when a large amount of change is required.

In addition, in the case where multiple arbitrary stopping positions are desired to be achieved with a single actuator, there is an issue that the difficulty of designing and manufacturing is increased due to the need for multi-pole magnetisation of a magnet, having to adjust the shape of a magnet sheet at a very tight angle, or the like.

Therefore, it is desired to provide a novel blade driving device capable of solving the above issue.

EXISTING ART DOCUMENT

Patent Document

Patent Document 1: Japanese Patent Application Laid-open No. 2014-10430
Patent document 2: Japanese Patent Application Laid-open No. 2010-276654
Patent Document 3: Japanese Patent Application Laid-open No. 10-68979
Patent Document 4: Japanese Patent Application Laid-open No. 2019-203944
Patent Document 5: Japanese Patent Application Laid-open No. 2019-148699
Patent Document 6: Japanese Patent Application Laid-open No. 2018-162621.

SUMMARY

The present disclosure provides a blade driving device, a camera device, and a portable electronic device, in order to solve the issue of increasing in difficulty of designing and manufacturing the structure of a blade driving device with which a user appropriately adjusts the amount of light in shooting.

In one aspect, a blade driving device is provided. The blade driving device includes a housing, a rotary body, a blade, at least one driving coil, a circuit board and at least one magnetic yoke.

The housing includes a base and a cover plate, where the base has a first through-hole, the cover plate has a second through-hole, the first through-hole and the second through-hole form an optical axis channel, the base and the cover plate form an accommodation space, and at least one rotating shaft extending into the accommodation space is disposed on the housing.

The rotary body is a magnetic member with at least two magnetic poles, provided with a pivot hole sleeved on a respective rotating shaft of the at least one rotating shaft, and rotatable relative to the respective rotating shaft.

The blade has one end fixedly connected to the rotary body and rotatable with the rotary body, and another end provided with a shielding portion and an opening portion, where the shielding portion is formed in a circumferential direction of the opening portion, and the optical axis channel is located in a moving path of the opening portion.

An orthographic projection of the rotary body in a direction of the optical axis channel has an overlapping area with the at least one driving coil.

A circuit board is electrically connected to the at least one driving coil.

At least one magnetic yoke, fixed to the housing.

As an improvement, the rotary body, the at least one driving coil and the circuit board are disposed sequentially along the optical axis channel, two magnetic yokes spaced apart from each other and disposed at an included angle with each other are provided, and orthographic projections of the two magnetic yokes have overlapping areas with the rotary body.

As an improvement, the two magnetic yokes are located on a side of the at least one driving coil away from the rotary body.

As an improvement, two driving coils are provided, and disposed opposite to different magnetic poles of the rotary body, respectively.

As an improvement, two blades and two rotary bodies are disposed in the accommodation space, each of the two blades are fixed to a respective rotary body of the two rotary bodies, the two blades have opening portions with different inner diameters, and the optical axis channel is located within moving paths of the two blades.

As an improvement, the blade includes a plurality of opening portions, and the optical axis channel is located within a moving path of each of the plurality of opening portions.

As an improvement, the plurality of opening portions have different inner diameters.

As an improvement, a position detecting element configured to detect a magnetic flux of the rotary body is disposed in the accommodation space.

As an improvement, the blade is provided with a countersink hole, and the rotary body extends into the countersink hole to form a rigid connection.

In a second aspect, a camera device is provided. The camera device includes the preceding blade driving device In a third aspect, a portable electronic device is provided. The portable electronic device includes the preceding camera device.

A portable electronic device, comprising the camera device according to any one of claim 10.

Compared with the related art, in the present disclosure, one end of the blade is connected to the rotary body to form a one-piece structure and the blade is rotatable with the rotation of the rotary body, thereby overcoming the technical problems of difficult assembly and increased structure difficulty caused by the split driving structure in the related art. In addition, compactness is achieved by omitting a number of mounted parts, realizing high efficient utilization of space and simplicity of structure and assembly, and enabling more efficient blade driving with a simpler structure.

REFERENCE LIST

| 10 | housing | 11 | base | 12 | cover plate |
|---|---|---|---|---|---|
| 13 | accommodation space | 14 | rotating shaft | 15 | first through hole |
| 16 | second through hole | 17 | limiting block | | |
| 20 | blade | 21 | shielding portion | 22 | opening portion |
| 23 | countersink hole | | | | |
| 30 | rotary body | 31 | pivot hole | | |
| 40 | driving coil | | | | |
| 50 | circuit board | | | | |
| 60 | magnetic yoke | | | | |
| 100 | blade driving device | | | | |
| 200 | camera device | | | | |
| 300 | portable electronic device | | | | |

DETAILED DESCRIPTION OF THE EMBODIMENTS

The embodiments described below with reference to the drawings are merely exemplary and intended to explain the present disclosure, and are not to be construed as limiting the present disclosure.

Embodiment One

As shown in FIGS. 1 to 12, an embodiment of the present disclosure provides a blade driving device 100 applied in a camera device 200, so as to control the amount of light entering the camera device 200 by blocking unwanted light on an optical axis channel with a blade 20.

In the embodiment provided in the present disclosure, the blade driving device 100 includes a housing 10, a rotary body 30, and a blade 20.

The housing 10 is internally provided with an accommodation space 13 in which an optical axis channel is formed. The housing 10 is provided with a first through hole 15 and a second through hole 16, which are coaxially arranged to form the optical axis channel.

Figure 2:
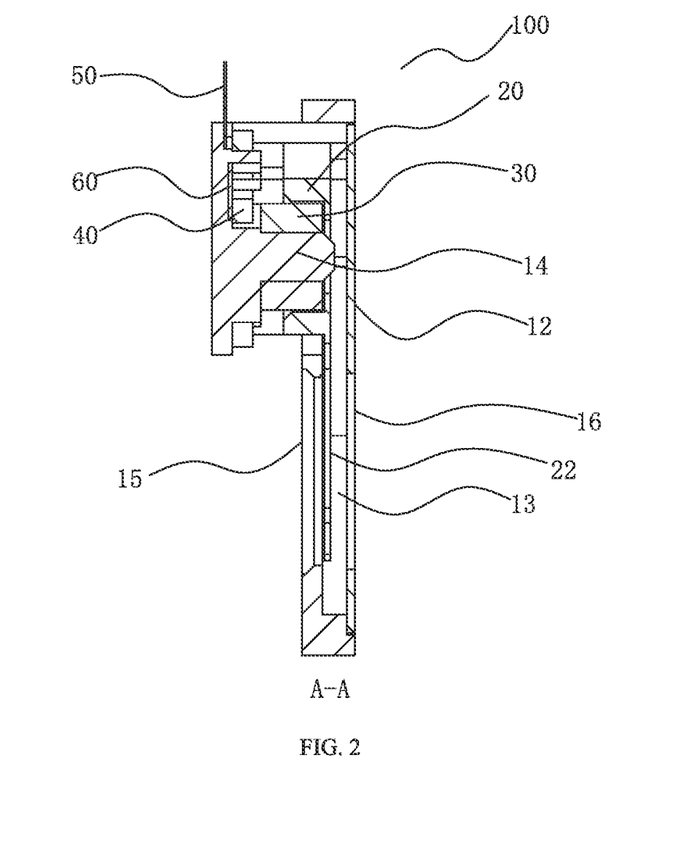
FIG. 2 is a sectional view taken along line A-A of FIG. 1.
Figure 3:
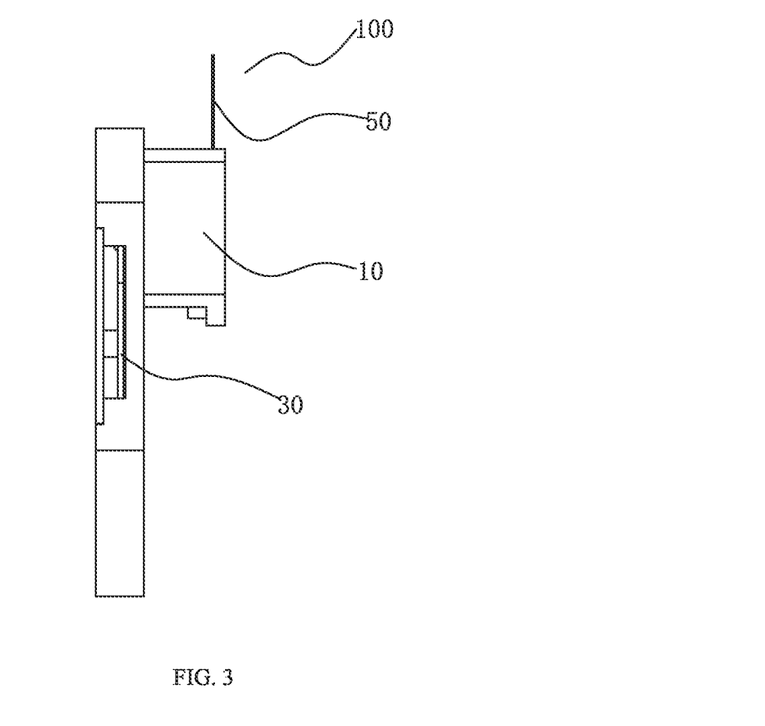
FIG. 3 is a side view of the blade driving device according to Embodiment one of the present disclosure.
Figure 4:
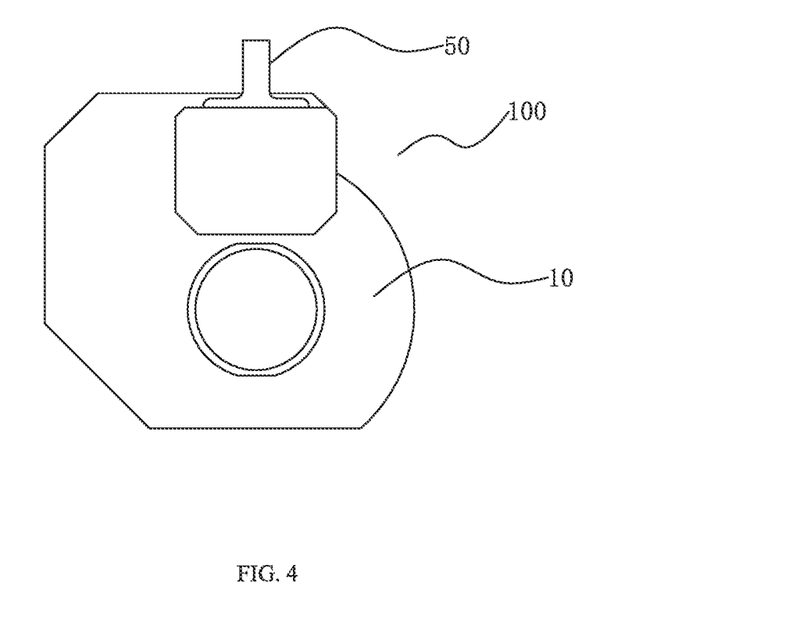
FIG. 4 is a rear view of the blade driving device according to Embodiment one of the present disclosure.
Figure 5:
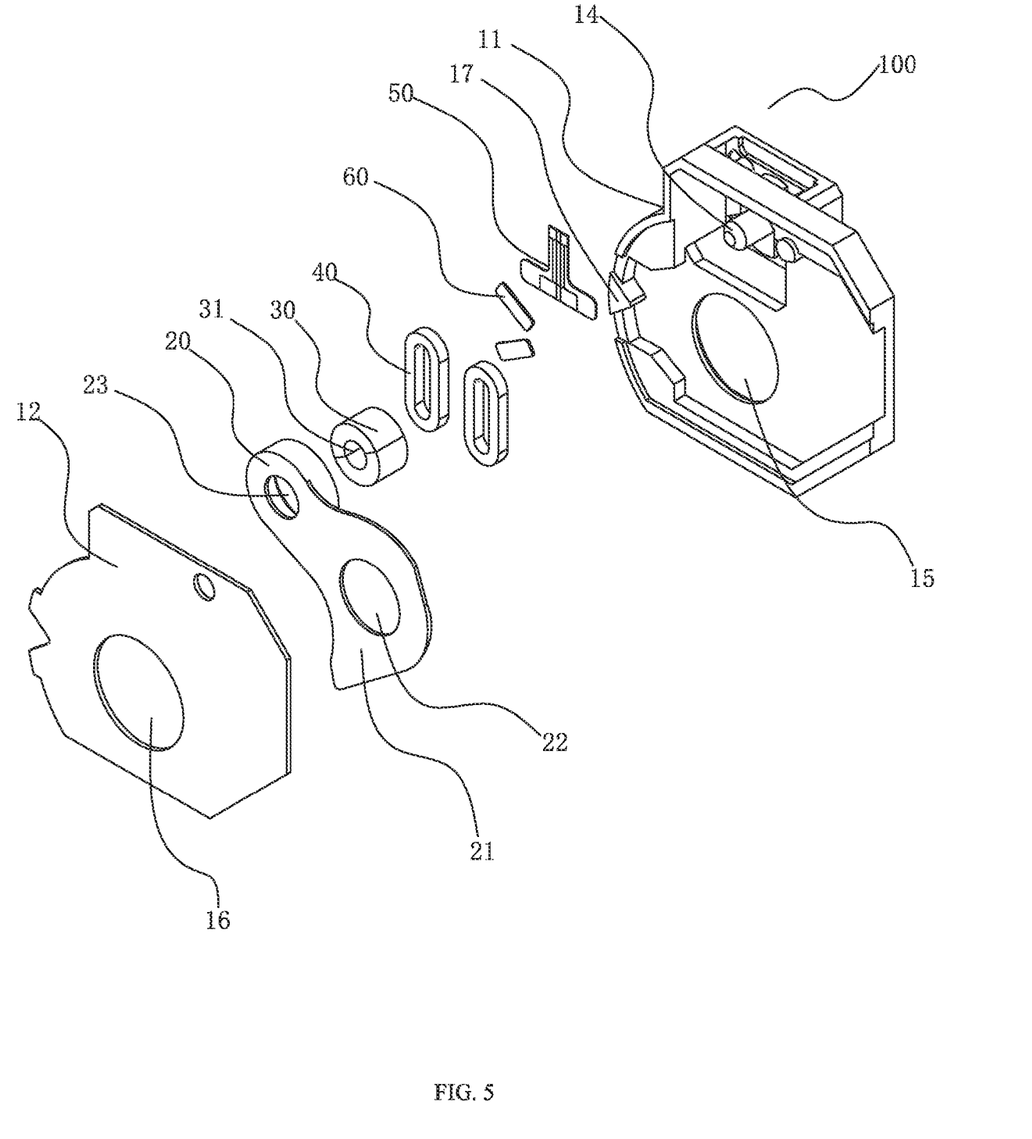
FIG. 5 is an exploded perspective view of the blade driving device according to Embodiment one of the present disclosure.

In a feasible implementation, referring to FIG. 2 and FIG. 5, the housing 10 is of a split structure to facilitate molding and assembly. Specifically, the housing 10 includes a base 11 and a cover plate 12, the first through hole 15 is disposed on the base 11, the second through hole 16 is disposed on the cover plate 12, the base 11 is of a box structure with one end open, and the cover plate 12 covers the open end by a fixing manner such as clamping, bonding or bolting to form the accommodation space 13.

Referring to FIGS. 2 and 5, a rotating shaft 14 is disposed in the accommodation space 13. In a feasible implementation, the rotating shaft 14 is integrally formed with the base 11 to facilitate molding processing. The rotating shaft 14 is a cylindrical shaft body and is disposed adjacent to the optical axis channel.

The rotary body 30 is provided with a pivot hole 31, and the rotating shaft 14 is clearance fitted in the pivot hole 31, so that the rotary body 30 is rotatable with an axial direction of the rotating shaft 14 as a rotation axis. During assembly, it is only necessary to open the cover plate 12 and bring the pivot hole 31 into alignment with the rotating shaft 14 for installation, thus reducing the manufacturing difficulty. The rotating shaft 1 is clearance fitted in the pivot hole 31, and the thickness of the rotating shaft 14 is coincided with the thickness of the rotary body 30, thereby reducing the space occupied by the housing 10 in a direction of the optical axis channel and facilitating the miniaturization of the blade driving device 100.

The blade 20 is disposed in the accommodation space 13, and has a first end connected to the rotary body 30. In a feasible implementation, the first end of the blade 20 is provided with a stepped countersink hole 23, the rotary body 30 extends into the countersink hole 23 and is fixed in the countersink hole 23 by a fixing manner such as clamping, bonding or bolting. The blade 20 is rotatable synchronously with the rotation of the rotary body 30. By extending the rotary body 30 into the countersink hole 23, the space occupied by the housing 10 in the direction of the optical axis channel can be further compressed, and the countersink hole 23 can also play a role in limiting the rotary body 30. The shape and size of the countersink hole 23 may be determined according to the shape and size of the rotary body 30, which is not limited herein.

Since the blade is made in a very thin shape, in the related art, a large amount of friction locally concentrates on a shaft member for supporting the blade due to repeated rotation of the blade, resulting in the generation of pollutants from the shaft member and the damage to the shaft member itself. In the present disclosure, by rigidly connecting the rotary body 30 to the blade 20, a large area of contact is maintained between the pivot hole 31 of the rotary body 30 and the rotating shaft 14, so that local stress concentration is not generated on the shaft member, and the durability can be greatly improved.

Figure 6:
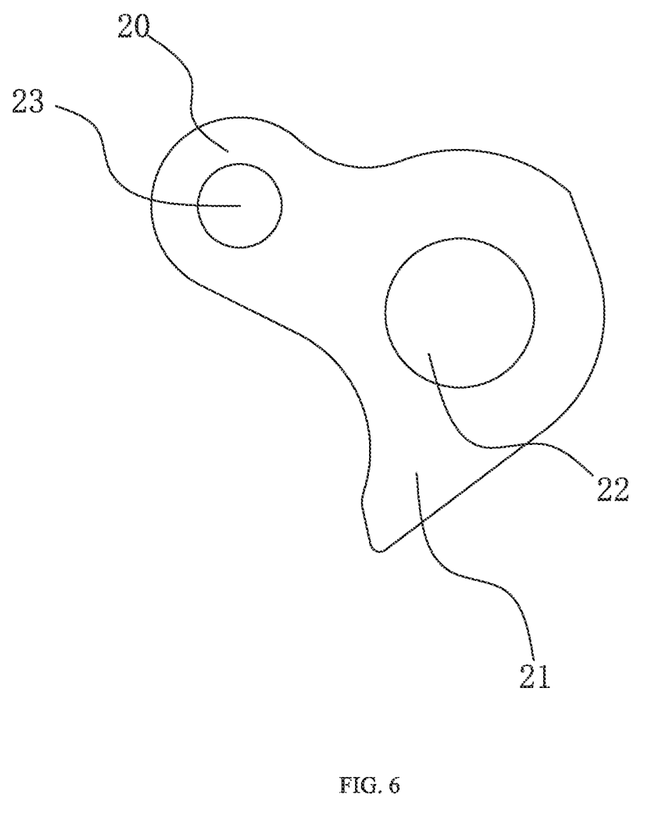
FIG. 6 is a front view of a blade of a first structure of the blade driving device according to Embodiment one of the present disclosure.

Referring to FIG. 5 and FIG. 6, a shielding portion 21 and an opening portion 22 are formed on a second end of the blade 20. The shielding portion 21 is formed in a circumferential direction of the opening portion 22, and the optical axis channel is located in a moving path of the opening portion 22. When the blade 20 is moved to a preset position, the opening portion 22 is coaxial with the optical axis channel. The opening portion 22 and the shielding portion 21 of the blade 20 can be configured in any shape which enables optically optimal light-shielding shape to achieve the purpose of improving performance.

Referring to FIG. 2 and FIG. 6, the opening portion 22 is of a through-slot structure penetrating through the blade 20. In this embodiment, the opening portion 22 is a circular slot. As appreciated by those skilled in the art, the opening portion 22 may be in other shape, such as a polygon of a triangle or more (e.g., a regular hexagon), which is not limited herein. When the blade 20 is rotated to a preset position, an axis of the first through-hole 15, an axis of the opening portion 22 and an axis of the second through-hole 16 coincide with each other. By changing an inner diameter or a shape of the opening portion 22, an amount of light entering the camera device 200 through the optical axis channel can be adjusted.

The shielding portion 21 is located in the circumferential direction of the opening portion 22, and is configured to block the passage of light. A blade 20 optimally matched with a light source may be appropriately used. In the case of visible light, a shielding portion 21 made of plastic coated in black may be selected. For light other than visible light, a shielding portion 21 made of metal may also be used, so as to meet the requirement of blocking the passage of light.

Further, in order to drive the rotary body 30 to rotate, in embodiments of the present disclosure, the rotary body 30 is a magnetic member and magnetized into a single-layer magnet having an N pole and an S pole, and a driving coil 40 and a circuit board 50 are disposed in the accommodation space 13. In a feasible implementation, the rotary body is a cylinder, the N pole and the S pole are disposed symmetrically along a radial direction of the rotating shaft 14, and a half of the rotary body by every 180° is a magnetic pole. As appreciated by those skilled in the art, one magnetic pole may be arranged by every 90°, and then the rotary body has four magnetic poles. In this case, two driving coils 40 may be disposed in parallel, or in an "L"-like shape.

The rotary body 30, the driving coil 40 and the circuit board 50 are disposed in sequence along the optical axis channel. The driving coil 40 is electrically connected to the circuit board 50. The rotary body 30 is driven to rotate by an electromagnetic force through the energization of the driving coil 40, and the blade 20 can be rotated together with the rotary body 30 to a preset position. At the preset position, the opening portion 22 forms a concentric hole structure with the first through hole 15 and the second through hole 16.

The driving principle of the rotary body 30 is as follows. When the driving coil 40 is energized, a Lorentz force is generated in the driving coil 40 by the interaction between a magnetic field of the rotary body 30 and a current flowing in the driving coil 40. Since the driving coil 40 is fixed, a reaction force acts on the rotary body 30 and becomes a driving force of the rotary body 30, so that the rotary body 30 is rotated with an axis direction of the rotating shaft 14 as a center.

A rotating direction of the rotary body 30 may be changed by changing a direction of the current flowing in the driving coil 40, so that the rotary body 30 can be rotated clockwise or counterclockwise in a plane orthogonal to the optical axis channel.

Figure 8:
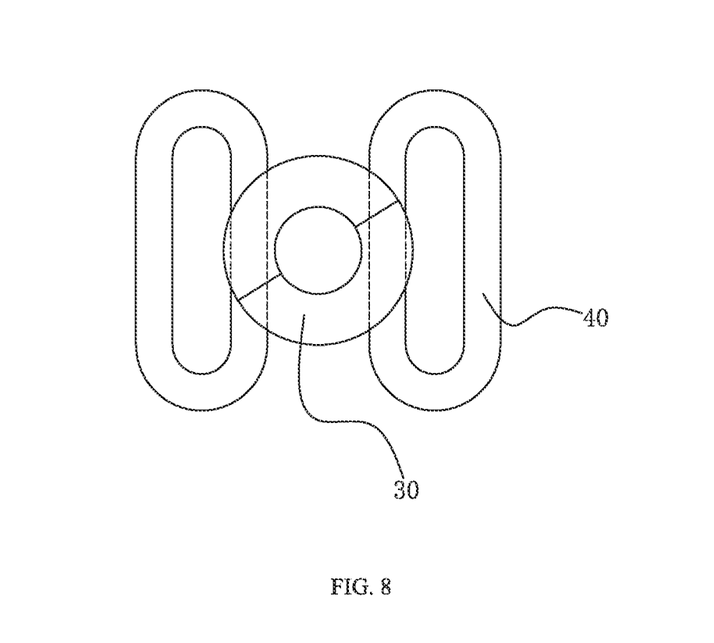
FIG. 8 is a schematic diagram illustrating structures of a rotary body and a driving coil in a first mating state of the blade driving device according to Embodiment one of the present disclosure.

In a feasible implementation, as shown in FIG. 8, two driving coils 40 are provided, the rotary body 30 is disposed between the two driving coils 40, and an orthographic projection of the rotary body 30 in the direction of the optical axis channel falls on the two driving coils 40, so that the rotary body 30 can utilize magnetic forces of the two driving coils 40 at the same time, whereby the rotary body 30 can be subjected to a greater driving force, thereby improving the rotation efficiency of the blade 20.

Figure 9:
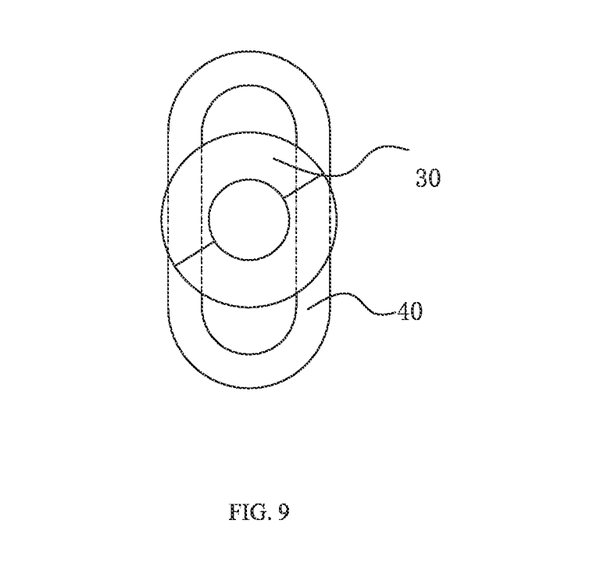
FIG. 9 is a schematic diagram illustrating structures of a rotary body and a driving coil in a second mating state of the blade driving device according to Embodiment one of the present disclosure.

In another feasible implementation, as shown in FIG. 9, only one driving coil 40 is provided, the driving coil 40 includes a left half portion and a right half portion symmetrically arranged along a length direction of the driving coil 40, and an orthographic projection of the rotary body 30 in the direction of the optical axis channel falls on both the left half portion and the right half portion, which helps to improve the simplicity of assembly and save space on the premise of satisfying the driving force.

Figure 10:
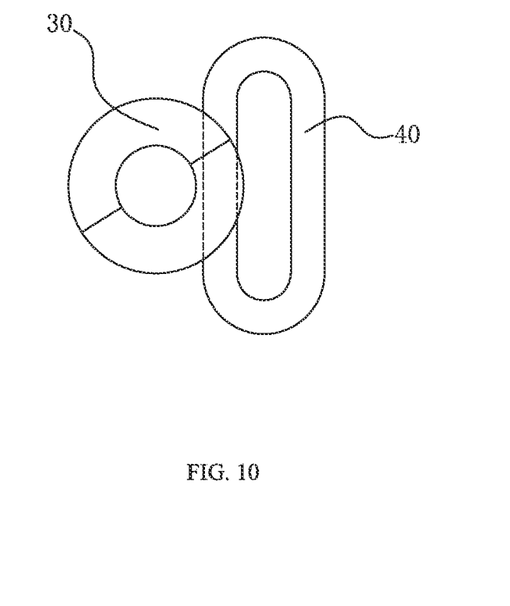
FIG. 10 is a schematic diagram illustrating structures of a rotary body and a driving coil in a third mating state of the blade driving device according to Embodiment one of the present disclosure.

In another feasible implementation, as shown in FIG. 10, only one driving coil 40 is provided, the driving coil 40 includes a left half portion and a right half portion symmetrically arranged along a length direction of the driving coil 40, and an orthographic projection of the rotary body 30 in the direction of the optical axis channel falls on either the left half portion or the right half portion, which helps to improve the simplicity of assembly and save space on the premise of satisfying the driving force.

In the embodiments provided in the present disclosure, in order to keep the rotary body 30 at a preset position, a magnetic yoke 60, as a magnet piece, is disposed at the boundary of the magnetic poles of the rotary body 30 at an appropriate rotating position of the blade 20. The magnetic yoke 60 is disposed at a preset position, so that during the rotation of the blade 20, when the boundary of the magnetic poles of the rotary body 30 comes into alignment with the magnetic yoke 60, the blade 20 stops rotating, and the opening portion 22 is coaxial with the optical axis channel. The magnetic yoke 60 is located on a side of the driving coil 40 away from the rotary body 30, and an orthographic projection of the magnetic yoke 60 in the direction of the optical axis channel has an overlapping area with the rotary body 30. The magnetic yoke 60, which is a magnet piece, always applies a force attracting the rotary body 30 to the base 11, and serves to keep a distance between the rotary body 30 and the driving coil 40 constant while the blade 20 is driven by an electromagnetic force.

Figure 1:
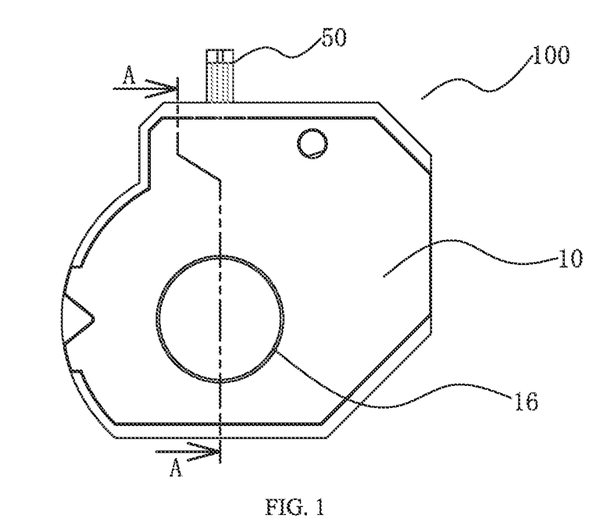
FIG. 1 is a front view of a blade driving device according to Embodiment one of the present disclosure.
Figure 11:
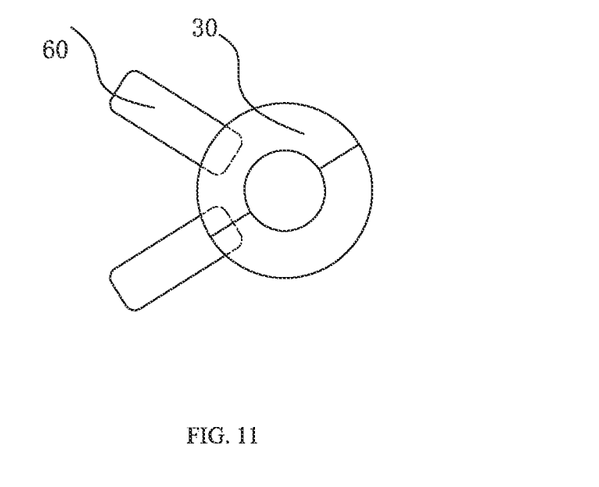
FIG. 11 is a schematic diagram illustrating structures of a rotary body and a magnetic yoke in a first mating state of the blade driving device according to Embodiment one of the present disclosure.
Figure 12:
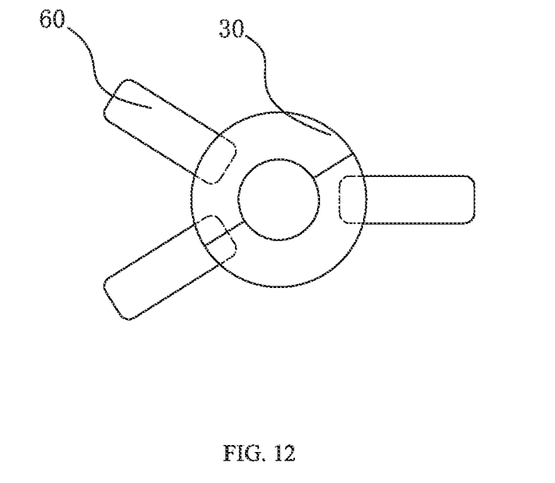
FIG. 12 is a schematic diagram illustrating structures of a rotary body and a magnetic yoke in a second mating state of the blade driving device according to Embodiment one of the present disclosure.

Further, a plurality of magnetic yokes 60 are provided, and orthographic projections of the magnetic yokes 60 in the direction of the optical axis channel fall on a moving path of the blade 20 so that the blade 20 has a plurality of stop positions. Referring to FIG. 11 and FIG. 12, in FIG. 11, there are two magnetic yokes 60, which are intersected to form a "V"-like shape or an "L"-like shape; and in FIG. 12, there are three magnetic yokes 60, which are intersected to form a "Y"-like shape. The plurality of magnetic yokes 60 are annularly spaced in the axial direction of the rotary body 30. Magnetic yokes 60 provided by the base 11 may be configured in switching positions of the two points as shown in FIG. 1, in switching positions of the three points as shown in FIG. 12, or other switching positions, as long as the magnetic yokes 60 are configured corresponding to positions where the magnetic poles of the rotary body 30 are desired to be stopped, to be able to cause the blade 20 having the opening portion 22 with an appropriate diameter to stop at a plurality of predetermined positions.

Further, as shown in FIG. 5, the base 11 is protruded with a limiting block 17 configured to limit a range of a moving path of the rotary body 30. When the rotary body 30 is rotated to abut against the limiting block 17, the rotary body 30 reaches the end of the moving path and cannot continue to rotate.

Figure 7:
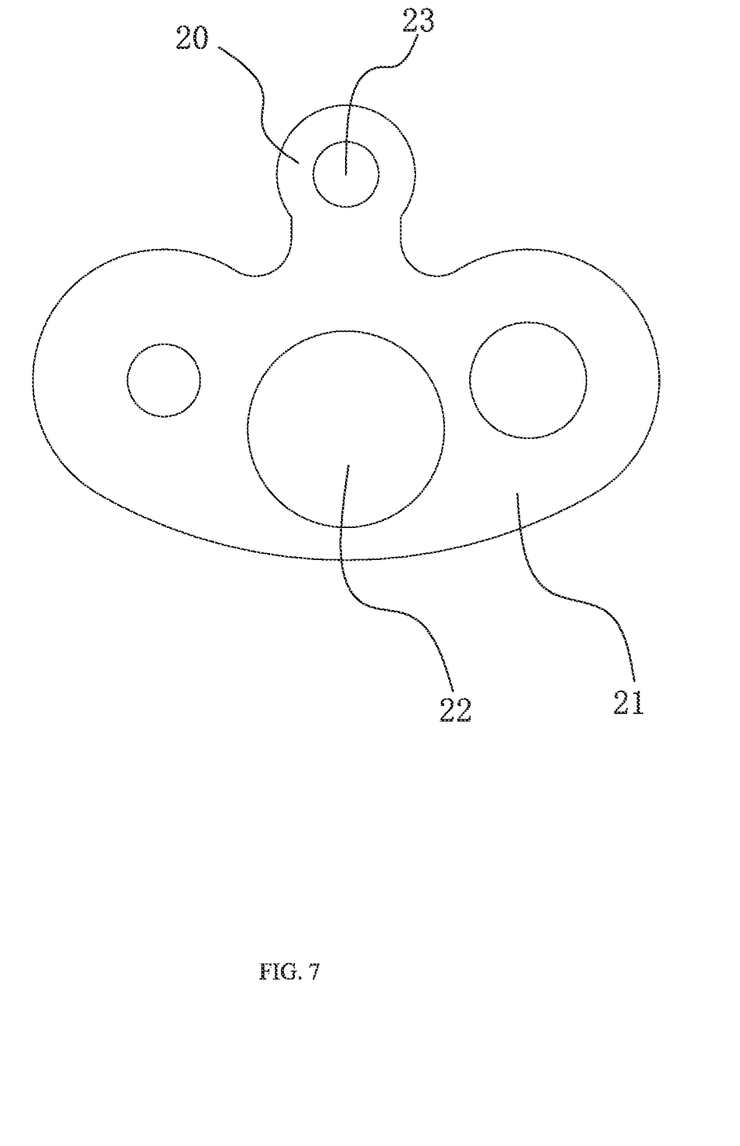
FIG. 7 is a front view of a blade of a second structure of the blade driving device according to Embodiment one of the present disclosure.

Referring to FIG. 7, one blade 20 is provided with a plurality of opening portions 22, and the optical axis channel is located in a moving path of each of the plurality of opening portions 22. The blade 20 has a plurality of preset positions. At each preset position, a respective opening portion 22 of the plurality of opening portions 22 corresponding to the optical axis channel is provided so that the axial directions of the first through hole 15, the respective opening portion 22 and the second through hole 16 coincide with each other. Further, each opening portion 22 is different in inner diameter, that is, each opening portion 22 has a different aperture. By providing a plurality of apertures, a plurality of shapes of the opening portions 22 can be appropriately selected for even a single blade 20, thereby forming a blade 20 with good optical characteristics.

In the embodiments provided by the present disclosure, a position detecting element (not shown) capable of detecting a magnetic flux of the rotary body 30 is disposed in the accommodation space 13. By detecting the magnetic flux of the rotary body 30, a position of the rotary body 30 can be accurately detected, and then a position of the blade 20 can be determined. The position detecting element may be disposed in the driving coil 40 and located in the same plane as the driving coil 40, thus further improving the space utilization rate and reducing a height of the housing 10.

Embodiment Two

In this embodiment, different from Embodiment one, a plurality of blades 20 may be disposed in the accommodation space 13, the optical axis channel is located in moving paths of the plurality of blades 20. Correspondingly, a plurality of pivot shafts are disposed in the accommodation space 13, one rotary body 30 is provided on each of the plurality of pivot shafts, each of the plurality of blades 20 is correspondingly fixed on a respective rotary body 30, and a driving coil 40 and a magnetic yoke 60 are provided for each of the plurality of rotary bodies 30, thus ensuring the degrees of freedom matched with the blades 20.

Figure 13:
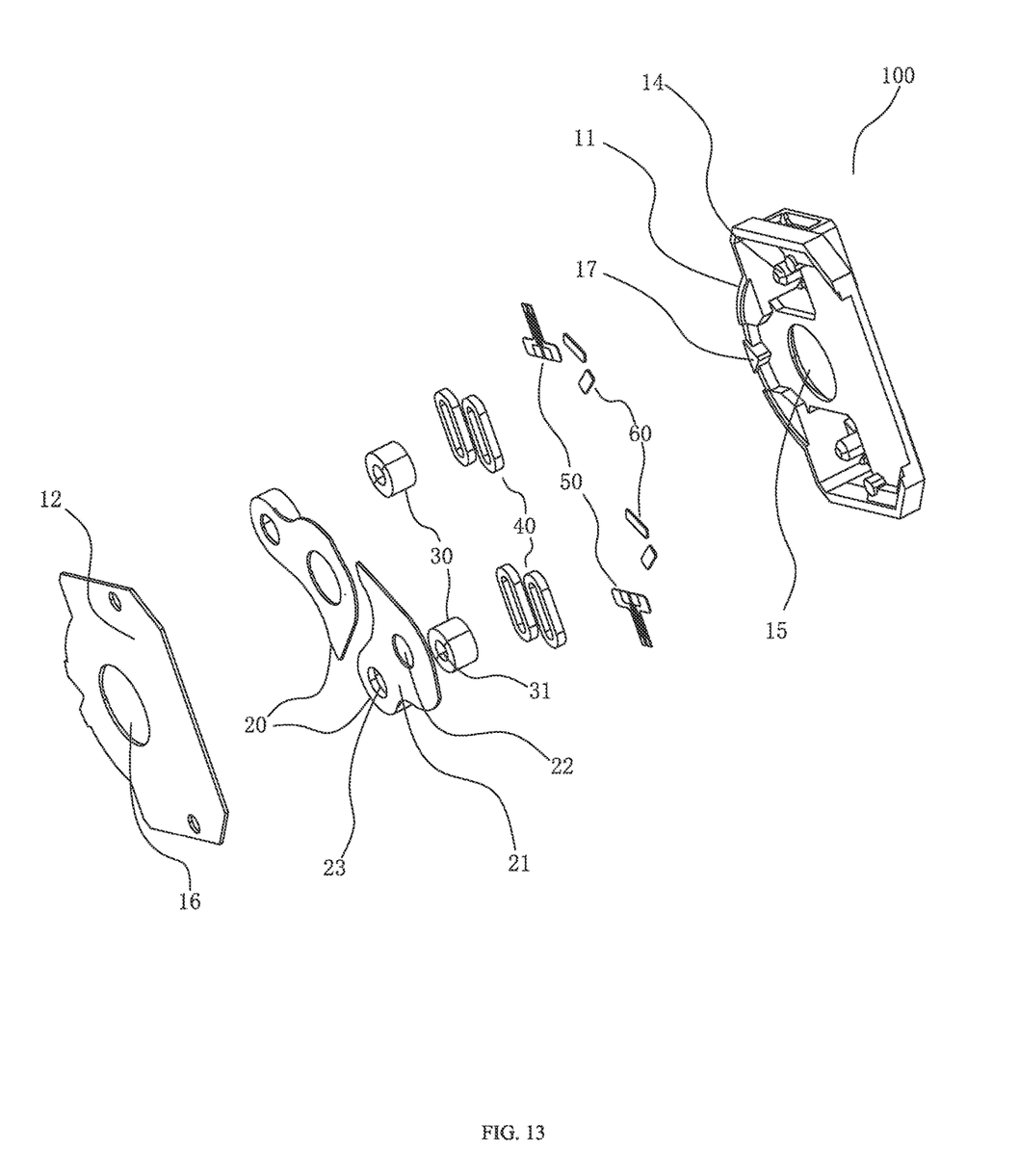
FIG. 13 is an exploded perspective view of a blade driving device according to Embodiment two of the present disclosure.

Specifically, as shown in FIG. 13, two blades 20 are disposed in the accommodation space 13, and located on two opposite sides of the optical axis channel respectively, the optical axis channel is located in moving paths of the two blades 20, and a driving coil 40 and a magnetic yoke 60 are correspondingly provided for each of two rotary bodies 30, and the inner diameters of the opening portions 22 provided on the two blades 20 may be the same or different.

On the basis of the blade driving device 100 provided in the above embodiments, the present disclosure further provides a camera device 200 including the preceding blade driving device 100. In the blade driving device 100, the rotary body 30 driven by electromagnetism is integrated with the blade 4, which features excellent assembly performance. The number of components such as a driving coil 40 and a magnetic yoke 60 can be reduced as required, and a plurality of arbitrary stop positions can be realized by one rotary body 30, which also greatly reducing the design difficulty. In combination with the light amount adjustment provided by the blade driving device, the quality of the photographed image can be improved.

Figure 14:
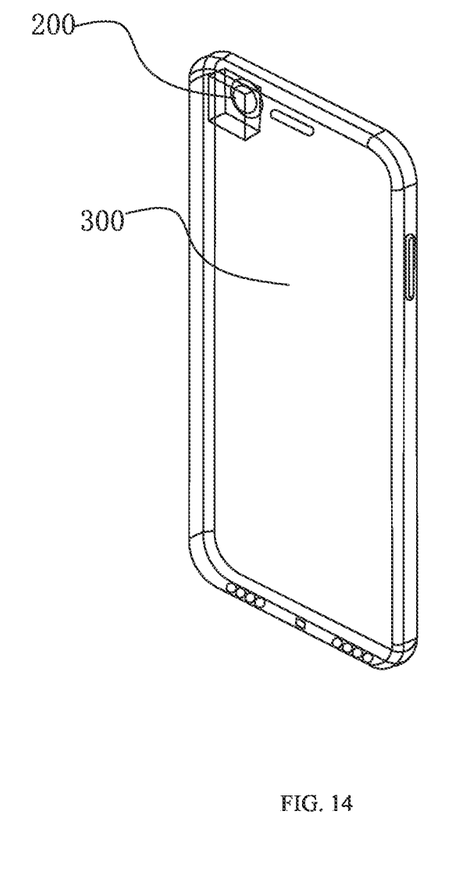
FIG. 14 is a schematic diagram illustrating a structure of a portable electronic device including the blade driving device of the present disclosure.

Further referring to FIG. 14, the present disclosure further provides a portable electronic device 300, such as a smart phone or a tablet device, including the preceding camera device 200.

The structures, features and effects of the present disclosure are described above in detail in accordance with the embodiments shown in the drawings. The above are merely preferred embodiments of the present disclosure, and not intended to limit the scope of the present disclosure. Any changes made in accordance with the concept of the present disclosure, or equivalent embodiments modified by equivalent changes, are not beyond the spirit covered by the specification and drawings, and shall be within the scope of protection of the present disclosure.

What is claimed is:

1. A blade driving device, comprising:
a housing, including a base and a cover plate, wherein the base has a first through-hole, the cover plate has a second through-hole, the first through-hole and the second through-hole form an optical axis channel, the base and the cover plate form an accommodation space, and the housing is provided with at least one rotating shaft extending into the accommodation space;
a rotary body, being a magnetic member with at least two magnetic poles, provided with a pivot hole sleeved on a respective rotating shaft of the at least one rotating shaft, and rotatable relative to the respective rotating shaft;
a blade, having one end fixedly connected to the rotary body and rotatable with the rotary body, and another end provided with a shielding portion and an opening portion, wherein the shielding portion is formed in a circumferential direction of the opening portion, and the optical axis channel is located in a moving path of the opening portion;
at least one driving coil, wherein an orthographic projection of the rotary body in a direction of the optical axis channel has an overlapping area with the at least one driving coil;
a circuit board, electrically connected to the at least one driving coil; and
at least one magnetic yoke, fixed to the housing;

wherein the blade is provided with a countersink hole, and the rotary body extends into the countersink hole to form a rigid connection.

2. The blade driving device according to claim 1, wherein the rotary body, the at least one driving coil and the circuit board are disposed sequentially along the optical axis channel, two magnetic yokes spaced apart from each other and disposed at an included angle with each other are provided, and orthographic projections of the two magnetic yokes have overlapping areas with the rotary body.

3. The blade driving device according to claim 2, wherein the two magnetic yokes are located on a side of the at least one driving coil away from the rotary body.

4. The blade driving device according to claim 3, wherein two driving coils are provided, and disposed opposite to different magnetic poles of the rotary body, respectively.

5. The blade driving device according to claim 4, wherein two blades and two rotary bodies are disposed in the accommodation space, each of the two blades are fixed to a respective rotary body of the two rotary bodies, the two blades have opening portions with different inner diameters, and the optical axis channel is located within moving paths of the two blades.

6. The blade driving device according to claim 1, wherein the blade includes a plurality of opening portions, and the optical axis channel is located within a moving path of each of the plurality of opening portions.

7. The blade driving device according to claim 6, wherein the plurality of opening portions have different inner diameters.

8. The blade driving device according to claim 2, wherein a position detecting element configured to detect a magnetic flux of the rotary body is disposed in the accommodation space.

9. A camera device, comprising: a blade driving device, wherein the blade driving device includes:
a housing, including a base and a cover plate, wherein the base has a first through-hole, the cover plate has a second through-hole, the first through-hole and the second through-hole form an optical axis channel, the base and the cover plate form an accommodation space, and the housing is provided with at least one rotating shaft extending into the accommodation space;
a rotary body, being a magnetic member with at least two magnetic poles, provided with a pivot hole sleeved on a respective rotating shaft of the at least one rotating shaft, and rotatable relative to the respective rotating shaft;
a blade, having one end fixedly connected to the rotary body and rotatable with the rotary body, and another end provided with a shielding portion and an opening portion, wherein the shielding portion is formed in a circumferential direction of the opening portion, and the optical axis channel is located in a moving path of the opening portion;
at least one driving coil, wherein an orthographic projection of the rotary body in a direction of the optical axis channel has an overlapping area with the at least one driving coil;
a circuit board, electrically connected to the at least one driving coil; and
at least one magnetic yoke, fixed to the housing;
wherein the blade is provided with a countersink hole, and the rotary body extends into the countersink hole to form a rigid connection.

10. The camera device according to claim 9, wherein the rotary body, the at least one driving coil and the circuit board are disposed sequentially along the optical axis channel, two magnetic yokes spaced apart from each other and disposed at an included angle with each other are provided, and orthographic projections of the two magnetic yokes have overlapping areas with the rotary body.

11. The camera device according to claim 10, wherein the two magnetic yokes are located on a side of the at least one driving coil away from the rotary body.

12. The camera device according to claim 11, wherein two driving coils are provided, and disposed opposite to different magnetic poles of the rotary body, respectively.

13. The camera device according to claim 9, wherein two blades and two rotary bodies are disposed in the accommodation space, each of the two blades are fixed to a respective rotary body of the two rotary bodies, the two blades have opening portions with different inner diameters, and the optical axis channel is located within moving paths of the two blades.

14. The camera device according to claim 9, wherein the blade includes a plurality of opening portions, and the optical axis channel is located within a moving path of each of the plurality of opening portions.

15. The camera device according to claim 14, wherein the plurality of opening portions have different inner diameters.

16. The camera device according to claim 10, wherein a position detecting element configured to detect a magnetic flux of the rotary body is disposed in the accommodation space.

17. A portable electronic device, comprising: a camera device, wherein the camera device includes:
a blade driving device, wherein the blade driving device includes:
a housing, including a base and a cover plate, wherein the base has a first through-hole, the cover plate has a second through-hole, the first through-hole and the second through-hole form an optical axis channel, the base and the cover plate form an accommodation space, and the housing is provided with at least one rotating shaft extending into the accommodation space;
a rotary body, being a magnetic member with at least two magnetic poles, provided with a pivot hole sleeved on a respective rotating shaft of the at least one rotating shaft, and rotatable relative to the respective rotating shaft;
a blade, having one end fixedly connected to the rotary body and rotatable with the rotary body, and another end provided with a shielding portion and an opening portion, wherein the shielding portion is formed in a circumferential direction of the opening portion, and the optical axis channel is located in a moving path of the opening portion;
at least one driving coil, wherein an orthographic projection of the rotary body in a direction of the optical axis channel has an overlapping area with the at least one driving coil;
a circuit board, electrically connected to the at least one driving coil; and
at least one magnetic yoke, fixed to the housing;
wherein the blade is provided with a countersink hole, and the rotary body extends into the countersink hole to form a rigid connection.

18. The portable electronic device according to claim 17, wherein the rotary body, the at least one driving coil and the circuit board are disposed sequentially along the optical axis channel, two magnetic yokes spaced apart from each other and disposed at an included angle with each other are provided, and orthographic projections of the two magnetic yokes have overlapping areas with the rotary body.

\* \* \* \* \*